United States Patent
Pinayour Chandrasekaran et al.

(10) Patent No.: US 11,889,507 B2
(45) Date of Patent: Jan. 30, 2024

(54) BASE STATION RESOURCE SELECTION FOR TWO STEP RANDOM ACCESS PROCEDURE

(71) Applicant: QUALCOMM Incorporated, San Diego, CA (US)

(72) Inventors: Sarath Pinayour Chandrasekaran, Hyderabad (IN); Satish Kumar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 176 days.

(21) Appl. No.: 17/444,443

(22) Filed: Aug. 4, 2021

(65) Prior Publication Data

US 2023/0044375 A1    Feb. 9, 2023

(51) Int. Cl.
| | |
|---|---|
| *H04W 72/04* | (2023.01) |
| *H04L 5/00* | (2006.01) |
| *H04W 72/02* | (2009.01) |
| *H04W 72/21* | (2023.01) |
| *H04W 72/0446* | (2023.01) |
| *H04W 72/0453* | (2023.01) |

(52) U.S. Cl.
CPC .......... *H04W 72/21* (2023.01); *H04L 5/0051* (2013.01); *H04W 72/02* (2013.01); *H04W 72/0446* (2013.01); *H04W 72/0453* (2013.01)

(58) Field of Classification Search
CPC ............. H04W 72/0453; H04W 72/21; H04W 72/0446; H04W 74/006; H04W 72/02; H04W 74/0833; H04L 5/0051
See application file for complete search history.

(56) References Cited

U.S. PATENT DOCUMENTS

| | | | | |
|---|---|---|---|---|
| 2021/0105121 | A1* | 4/2021 | Chae | H04L 5/0048 |
| 2021/0167914 | A1* | 6/2021 | Kwak | H04W 72/51 |
| 2021/0320760 | A1* | 10/2021 | Rastegardoost | H04L 1/0061 |
| 2022/0053567 | A1* | 2/2022 | Lei | H04L 5/0048 |

(Continued)

FOREIGN PATENT DOCUMENTS

WO    WO 2021/221551 A1 * 11/2021 ............ H04W 24/02

OTHER PUBLICATIONS

Ericsson: "2-Step RACH Optimization for SON", 3GPP TSG-RAN WG3 #1010-e, Tdoc R3-206517, 3rd Generation Partnership Project, Mobile Competence Centre, 650, Route Des Lucioles, F-06921 Sophia-Antipolis Cedex, France, vol. RAN WG3, No. Electronic Meeting, Nov. 2, 2020- Nov. 12, 2020 Oct. 22, 2020, XP051941789, pp. 1-5, Section 2.1.

(Continued)

*Primary Examiner* — Brian D Nguyen
(74) *Attorney, Agent, or Firm* — Harrity & Harrity, LLP

(57) ABSTRACT

Various aspects of the present disclosure generally relate to wireless communication. In some aspects, a base station may extract, from a neighboring base station with cell coverage that overlaps cell coverage of the base station, information associated with user equipment (UE) transmission of MsgA messages. The base station may select, based at least in part on the information, a physical uplink shared channel (PUSCH) resource to allocate to a UE for transmission of a MsgA message. The base station may transmit, to the UE, an allocation of the PUSCH resource. Numerous other aspects are described.

28 Claims, 6 Drawing Sheets

(56) References Cited

U.S. PATENT DOCUMENTS

| | | | | |
|---|---|---|---|---|
| 2022/0201527 A1* | 6/2022 | Matsumura | ........... | H04W 16/14 |
| 2022/0263599 A1* | 8/2022 | Matsumura | ........... | H04W 72/54 |
| 2022/0272760 A1* | 8/2022 | Murray | ............. | H04W 74/0833 |
| 2022/0312502 A1* | 9/2022 | Kim | .................. | H04W 74/0866 |
| 2022/0361016 A1* | 11/2022 | Matsumura | ........... | H04L 5/0023 |

OTHER PUBLICATIONS

Ericsson: "2-Step RACH Optimization for SON", 3GPP TSG-RAN WG3 #109-e, R3-205021, 3rd Generation Partnership Project, Mobile Competence Centre, 650, Route Des Lucioles, F-06921 Sophia-Antipolis Cedex, France, vol. RAN WG3, No. Electronic Meeting, Aug. 17, 2020-Aug. 28, 2020 Aug. 6, 2020, XP051911370, pp. 1-3, Section 1, Section 2.1.

International Search Report and Written Opinion—PCT/US2022/038196—ISA/EPO—dated Oct. 14, 2022.

Nokia et al., "Remaining Issues and New Aspects in 2-Step NR UE RACH Report", 3GPP TSG-RAN WG2 Meeting #114 Electronic, R2-2105477, 3rd Generation Partnership Project, Mobile Competence Centre, 650, Route Des Lucioles, F-06921 Sophia-Antipolis Cedex, France, vol. RAN WG2, No. Electronic, May 19, 2021-May 27, 2021 May 11, 2021, XP052007067, 5 Pages, Paragraph after Proposal 7.

\* cited by examiner

BASE STATION RESOURCE SELECTION FOR TWO STEP RANDOM ACCESS PROCEDURE

FIELD OF THE DISCLOSURE

Aspects of the present disclosure generally relate to wireless communication and to techniques and apparatuses for a base station to select resources that a user equipment uses for a two-step random access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a base station. The method may include extracting, from a neighboring base station with cell coverage that overlaps cell coverage of the base station, information associated with user equipment (UE) transmission of MsgA messages. The method may include selecting, based at least in part on the information, a physical uplink shared channel (PUSCH) resource to allocate to a UE for transmission of a MsgA message. The method may include transmitting, to the UE, an allocation of the PUSCH resource.

Some aspects described herein relate to a base station for wireless communication. The base station may include memory, one or more processors coupled to the memory, and instructions stored in the memory and executable by the one or more processors. The instructions may be executable by the one or more processors to cause the base station to extract, from a neighboring base station with cell coverage that overlaps cell coverage of the base station, information associated with UE transmission of MsgA messages. The instructions may be executable by the one or more processors to cause the base station to select, based at least in part on the information, a PUSCH resource to allocate to a UE for transmission of a MsgA message. The instructions may be executable by the one or more processors to cause the base station to transmit, to the UE, an allocation of the PUSCH resource.

Some aspects described herein relate to a non-transitory computer-readable medium that stores a set of instructions for wireless communication by a non-transitory computer-readable medium storing a set of instructions for wireless communication, the set of instructions comprising one or more instructions that, when executed by one or more processors of a base station, cause the base station to extract, from a neighboring base station with cell coverage that overlaps cell coverage of the base station, information associated with UE transmission of MsgA messages. The set of instructions comprising one or more instructions that, when executed by one or more processors of a base station, cause the base station to select, based at least in part on the information, a PUSCH resource to allocate to a UE for transmission of a MsgA message and transmit, to the UE, an allocation of the PUSCH resource.

Some aspects described herein relate to an apparatus for wireless communication. The apparatus may include means for extracting, from a neighboring base station with cell coverage that overlaps cell coverage of the apparatus, information associated with UE transmission of MsgA messages. The apparatus may include means for selecting, based at least in part on the information, a PUSCH resource to allocate to a UE for transmission of a MsgA message. The apparatus may include means for transmitting, to the UE, an allocation of the PUSCH resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
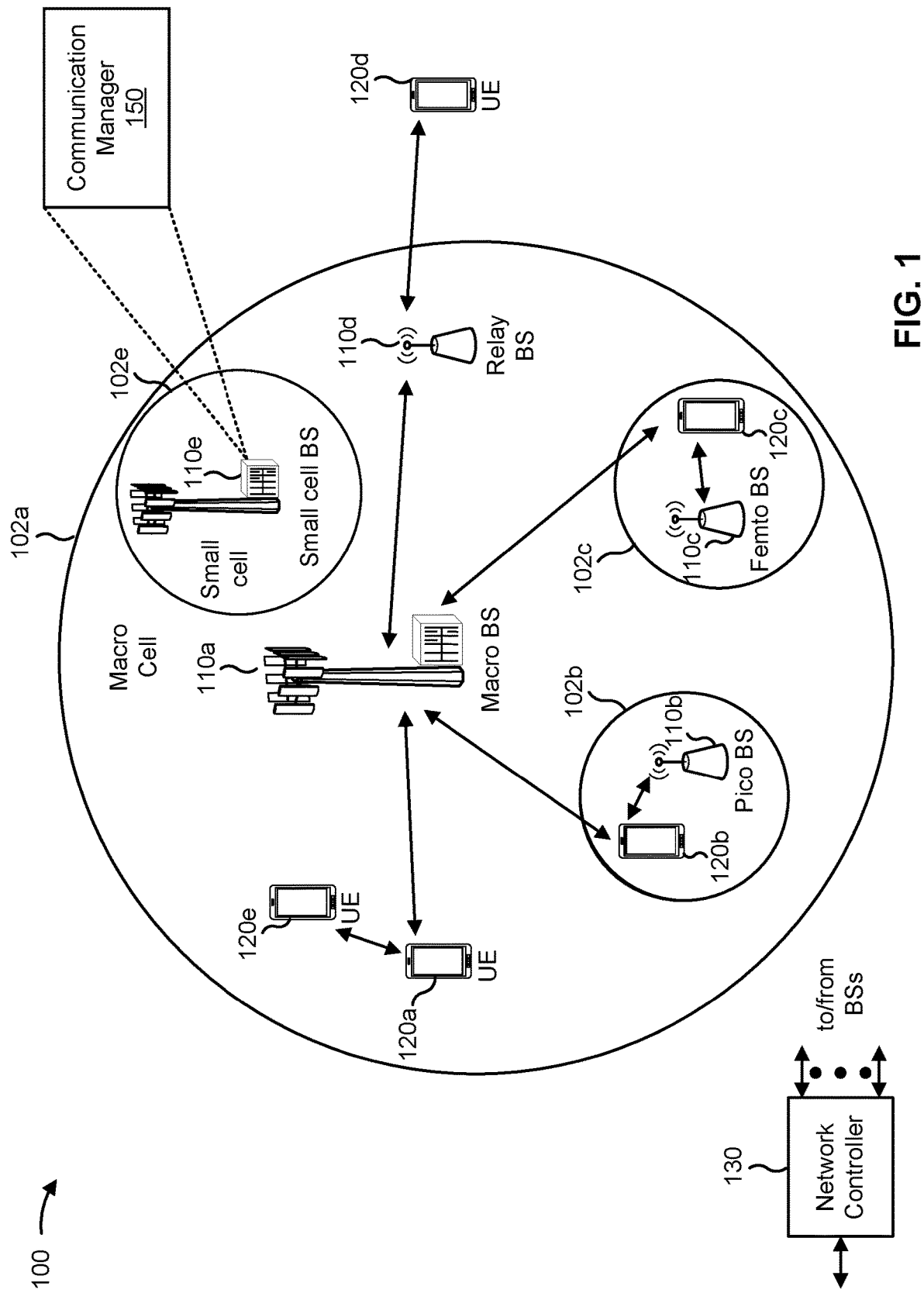
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein. BS 110e may be a small cell BS that serves a small cell 102e that overlaps in coverage with a macro cell 102a.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the base station 110 may include a communication manager 150. As described in more detail elsewhere herein, the communication manager 150 may extract, from a neighboring base station with cell coverage that overlaps cell coverage of the base station, information associated with UE transmission of MsgA messages. The communication manager 150 may select, based at least in part on the information, a PUSCH resource to allocate to a UE for transmission of a MsgA message. The communication manager 150 may transmit, to the UE, an allocation of the PUSCH resource. Additionally, or alternatively, the communication manager 150 may perform one or more other operations described herein.

As indicated above, FIG. 1 is provided as an example. Other examples may differ from what is described with regard to FIG. 1.

Figure 2:
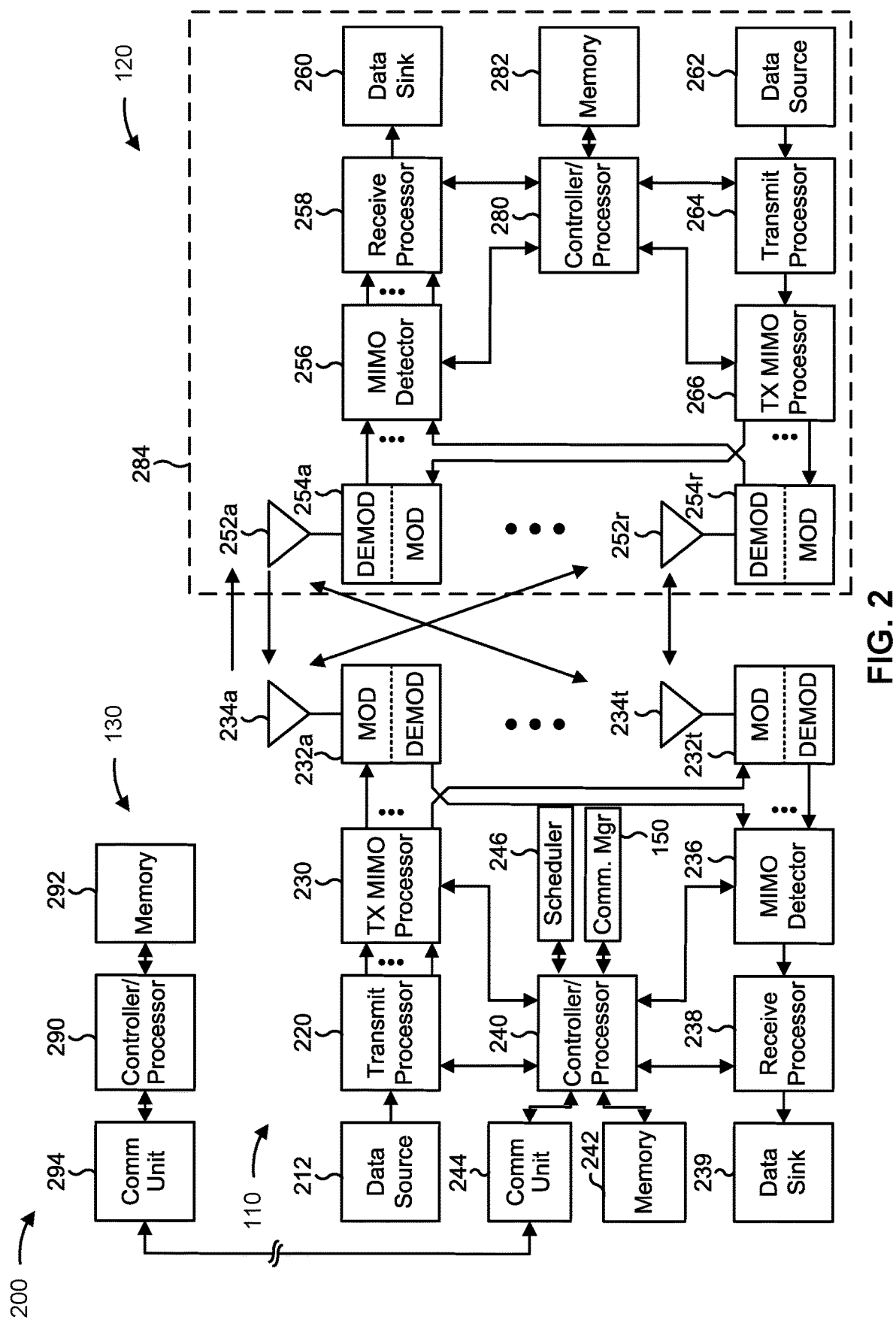
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-6).

Controller/processor 240 of base station 110 and/or any other component(s) of FIG. 2 may perform one or more techniques associated with a base station selecting resources for a two-step random access procedure, as described in more detail elsewhere herein. For example, controller/processor 240 of base station 110 and/or any other component(s) of FIG. 2 may perform or direct operations of, for example, process 500 of FIG. 5 and/or other processes as described herein. Memory 242 may store data and program codes for base station 110. In some aspects, memory 242 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, may cause the one or more processors and/or the base station 110 to perform or direct operations of, for example, process 500 of FIG. 5 and/or other processes as described herein. In some aspects, executing instructions may include running the instructions, converting the instructions, compiling the instructions, and/or interpreting the instructions, among other examples.

In some aspects, the base station 110 includes means for extracting, from a neighboring base station with cell coverage that overlaps cell coverage of the base station, information associated with UE transmission of MsgA messages, means for selecting, based at least in part on the information, a PUSCH resource to allocate to a UE for transmission of a MsgA message, and/or means for transmitting, to the UE, an allocation of the PUSCH resource. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
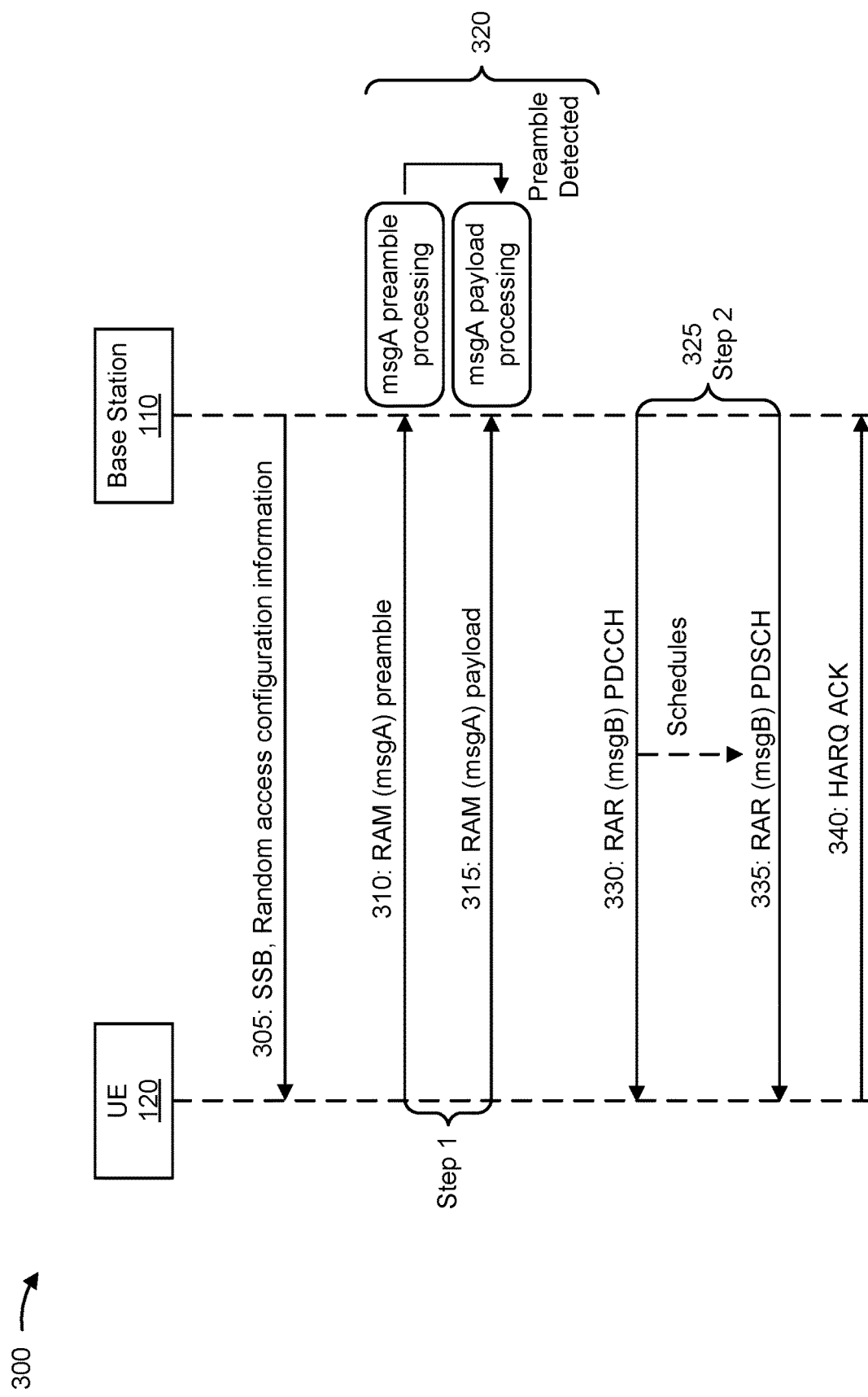
FIG. 3 is a diagram illustrating an example of a two-step random access procedure, in accordance with the present disclosure.

FIG. 3 is a diagram illustrating an example 300 of a two-step random access procedure, in accordance with the present disclosure. As shown in FIG. 3, a base station 110 and a UE 120 may communicate with one another to perform the two-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a random access channel (RACH) procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 310, the UE 120 may transmit, and the base station 110 may receive, a RAM preamble. As shown by reference number 315, the UE 120 may transmit, and the base station 110 may receive, a RAM payload. The UE 120 may transmit the RAM preamble and the RAM payload to the base station 110 as part of an initial (or first) step of the two-step random access procedure. In some aspects, the RAM may be referred to as message A, MsgA, a first message, or an initial message in a two-step random access procedure. Furthermore, in some aspects, the RAM preamble may be referred to as a message A preamble, a MsgA preamble, a preamble, or a physical random access channel (PRACH) preamble, and the RAM payload may be referred to as a message A payload, a MsgA payload, or a payload. In some aspects, the RAM may include some or all of the contents of message 1 (Msg1) and message 3 (Msg3) of a four-step random access procedure. For example, the RAM preamble may include some or all contents of Msg1 (e.g., a PRACH preamble), and the RAM payload may include some or all contents of Msg3 (e.g., a UE identifier, uplink control information (UCI), and/or a PUSCH transmission).

The use of a two-step random access procedure may be better suited for neighboring base stations with overlapping coverage. The Msg3 of a four-step random access procedure may be dynamically scheduled through downlink control information (DCI), and scheduling cannot be controlled based on a neighbor base station's schedule. By contrast, the MsgA of a two-step random access procedure may be predefined by a base station and broadcast in a SIB 1. Accordingly, the MsgA may be defined with respect to a neighboring base station's configuration.

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, MsgB, or a second message in a two-step random access procedure. The RAR message may include some or all of the contents of message 2 (Msg2) and message 4 (Msg4) of a four-step random access procedure. For example, the RAR message may include the detected PRACH preamble identifier, the detected UE identifier, a timing advance value, and/or contention resolution information.

As shown by reference number 330, as part of the second step of the two-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in DCI) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

In an NR network, a two-step random access procedure may reduce latency and control-signaling overhead by combining the preamble (Msg1) and the scheduled PUSCH transmission (Msg3) of a four-step random access procedure into a single message (MsgA) from the UE. However, in a two-step random access procedure, DMRS and data scrambling identities are configurable rather than matched to unique physical cell identifiers (IDs) as in a four-step random access procedure. Consequently, interference suppression may be difficult for a base station that is part of a two-step random access procedure, even between base stations that have unique cell IDs, because the scrambling IDs may be the same. For example, if pdcch-DMRS-ScramblingID is the same between base stations, then the magnitude of the interference would be high and result in false DCI.

In overlay networks with base stations having overlapping coverage, the use of identical MsgA-PUSCH common configurations between base stations can cause mutual interference and result in performance degradation. For example, there may be interference in an initial downlink bandwidth part (BWP) or uplink BWP resulting in a PDCCH, a PDSCH, or a physical uplink shared channel (PUSCH) cyclic redundancy check (CRC) error due to SNR degradation. The interference may trigger frequent Msg3 retransmissions and cause the base station to fall back to a four-step random access procedure. Falling back to a four-step random access procedure will increase latency, decrease the effective use of physical layer resources, and increase UE power consumption, which will negate some advantages of the two-step random access procedure. Falling back to a four-step random access procedure may significantly impact ultra-reliable low-latency communication (URLLC) devices (latency dependent) and massive MTC (mMTC) devices (power dependent).

As indicated above, FIG. 3 is provided as an example. Other examples may differ from what is described with regard to FIG. 3.

Figure 4:
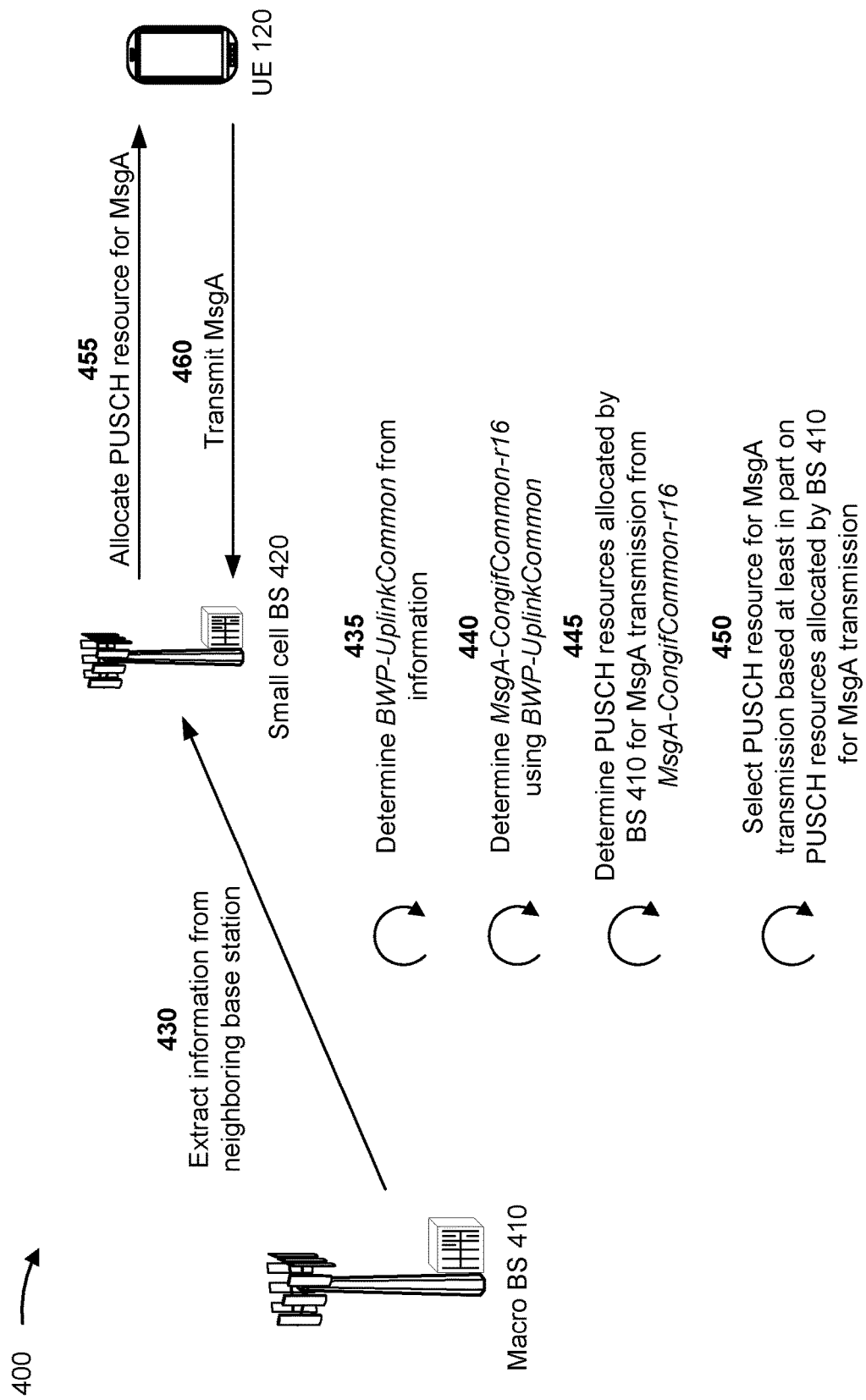
FIG. 4 is a diagram illustrating an example of a base station selecting resources for a two-step random access procedure, in accordance with the present disclosure.

FIG. 4 is a diagram illustrating an example 400 of a base station selecting resources for a two-step random access procedure, in accordance with the present disclosure. As shown in FIG. 4, a macro base station (BS) 410 (e.g., BS 110a) and a small cell BS 420 (e.g., BS 110e) may overlap in cell coverage and may communicate with one another. The BS 420 may operate in a hyper dense network amidst multiple other neighboring BSs. The BS 420 may communicate with a UE, such as the UE 120.

According to various aspects described herein, the BS 420 may select a MsgA-PUSCH configuration such that a PUSCH resource used by the BS 420 does not overlap or otherwise interfere with PUSCH resources used by neighboring base stations, such as BS 410. By optimizing or fine-tuning a MsgA-PUSCH configuration and selecting PUSCH resources that do not interfere with neighboring base stations, the BS 410 and the BS 420 may conserve processing resources and signaling resources by avoiding interference, poor channel estimation, SNR degradation, performance degradation (e.g., CRC errors), and/or multiple retransmissions. The BS 410 and the BS 420 may also reduce latency and conserve processing resources and signaling resources that would otherwise be consumed by falling back to a four-step random access procedure.

The BS 420 in example 400 may configure itself or may be configured by the network. The BS 420 may extract information from one or more neighboring base stations with overlapping cell coverage. The information may be extracted from neighboring base stations having a cell coverage that meets a specified RSRP or signal-to-noise ratio (SNR). As shown by reference number 430, the BS 420 may extract information from the BS 410. The BS 420 may perform a network listening (NL) scan or otherwise receive the information about the BS 410 (e.g., via an interface or an integrated access backhaul (IAB)). The information may include a master information block (MIB), a SIB, or a physical broadcast channel (PBCH). The information may include multiple parameters or values of a MsgA PUSCH configuration. The information may include SIB1 parameters ServingCellConfigCommonSIB, UplinkConfigCommonSIB, and BWP-UplinkCommon. As shown by reference number 435, the BS 420 may determine the parameter BWP-UplinkCommon from the information.

As shown by reference number 440, the BS 420 may use the parameter BWP-UplinkCommon to determine parameter MsgA-ConfigCommon-r16. The parameter MsgA-Config-Common-r16 may be included in the parameter BWP-UplinkCommon. The parameter MsgA-ConfigCommon-r16 may include parameters RACH-ConfigCommonTwoStepRA-r16, RACH-ConfigGenericTwoStepRA-r16, msgA-PRACH-ConfigurationIndex-r16, and MsgA-PUSCH-Config-r16.

As shown by reference number 445, the BS 420 may determine PUSCH resources allocated by the BS 410 for MsgA transmission by UEs. For example, the parameter MsgA-PUSCH-Config-r16 may include a parameter MsgA-PUSCH-Resource-r16. The BS 420 may determine PUSCH resources (e.g., frequency location, time location, MCS, DMRS, scrambling configuration) allocated by the BS 410 for MsgA transmission by UEs from the parameter MsgA-PUSCH-Config-r16.

As shown by reference number 450, the BS 420 may select a PUSCH resource based at least in part on the PUSCH resources allocated by the BS 410 for MsgA transmission. For example, the BS 420 may select a PUSCH resource (or multiple PUSCH resources) that does not overlap with (or otherwise interfere with) PUSCH resources that are used by the BS 410 or other neighboring base stations, including PUSCH resources that are used for MsgA transmission by UEs.

The information of the BS 410 that is extracted by the BS 420 may include or may be used to determine one or more frequency domain parameters associated with a MsgA PUSCH configuration of the BS 410, and the BS 420 may select a PUSCH resource with a frequency domain (e.g., frequency, subcarrier, or bandwidth) that is different than or does not overlap with a frequency domain indicated by the one or more frequency domain parameters. This may include the BS 420 selecting a PUSCH resource with different frequency domain parameters than PUSCH resources used by the BS 410 (or other neighboring base stations).

A frequency domain parameter may include an interlace for a first PUSCH occasion or a resource block (RB) for the first PUSCH occasion (e.g., interlaceIndexFirstPO-MsgA-PUSCH/frequencyStartMsgA-PUSCH-r16). The interlace index may reference how RBs are to be arranged for a PUSCH occasion. A frequency domain parameter may include a quantity of interlaces per PUSCH occasion or a quantity of physical resource blocks (PRBs) per PUSCH occasion (e.g., nrofInterlacesPerMsgA-PO/nrofPRBs-PerMsgA-PO-r16). A frequency domain parameter may include guard band information for PUSCH occasions, such as a PRB-level guard band between frequency multiplexed PUSCH occasions (e.g., guardBandMsgA-PUSCH-r16). A frequency domain parameter may include a quantity of PUSCH occasions multiplexed in a time instance (e.g., nrofMsgA-PO-FDM-r16). A frequency domain parameter may include frequency hopping information for a PUSCH occasion, such as a parameter for enabling or disabling intra-slot frequency hopping per PUSCH occasion (e.g., msgA-IntraSlotFrequencyHopping-r16). A frequency domain parameter may include an RB offset for a second frequency hop (e.g., msgA-HoppingBits-r16).

The information may include one or more time domain parameters, and the BS 420 may select a PUSCH resource with a time domain (e.g., subframe, symbol) that is different than or does not overlap with a time domain indicated by the one or more time domain parameters. This may include the BS 420 selecting the PUSCH resource with different time domain parameters than PUSCH resources used by the BS 410 (or other neighboring base stations).

A time domain parameter may include a quantity of slots containing one or more PUSCH occasions with the same time domain allocation (e.g., nrofSlotsMsgA-PUSCH-r16). A time domain parameter may include a quantity of contiguous time domain PUSCH occasions in each slot (e.g., nrofMsgA-PO-PerSlot-r16). There may be guard periods between PUSCH occasions. A time domain parameter may include a combination of a start symbol, a length, and a PUSCH mapping type (e.g., msgA-PUSCH-TimeDomain-Allocation-r16). A time domain parameter may include an index of valid combinations of a start symbol, a length, and a PUSCH mapping type (e.g., startSymbolAndLength-MsgA-PO-r16). A time domain parameter may include a slot offset with respect to a PRACH slot (e.g., msgA-PUSCH-TimeDomainOffset-r16). The slot offset may be provided by msgA-PRACH-ConfigurationIndex-r16. A time domain parameter may include a guard period (e.g., in symbols) between PUSCH occasions (e.g., guardPeriodMsgA-PUSCH-r16).

DMRSs may be used for channel estimation, determining an SNR, and for determining decoding performance. The information may include a DMRS configuration of the BS 410. The BS 420 may use a DMRS configuration with different DMRS parameters than the DMRS parameters that are used in the DMRS configuration for PUSCH resources of the BS 410. A DMRS parameter may include a PUSCH mapping type (e.g., Type A or Type B indicated by mappingTypeMsgA-PUSCH-r16). A DMRS parameter may indicate a single-symbol or double-symbol DMRS (e.g., msgA-MaxLength-r16). A DMRS parameter may include a 1-bit indication of indices of code division multiplexing (CDM) groups (e.g., msgA-PUSCH-DMRS-CDM-Group-r16). A DMRS parameter (e.g., msgA-PUSCH-NrofPorts-r16) may indicate a quantity of ports per CDM group, where 0 indicates 1 port per CDM group, 1 indicates 2 ports per CDM group, or otherwise there are 4 ports per CDM group. A DMRS parameter (e.g., nrofDMRS-Sequences-r16) may indicate a quantity of DMRS sequences for a MsgA PUSCH for cyclic prefix (CP) OFDM.

In some aspects, the BS 420 may avoid interference by using the same DMRS Type A position as the BS 410 (e.g., indicated by msgA-DMRS-AdditionalPosition-r16). By aligning the DMRS Type A positions, even if there is interference, the interference may be mostly from DMRS resource elements (REs), and the magnitude of the interference may be smaller compared to interference at data REs. For example, if the DMRS Type A position of the BS 410 is pos 2 and the DMRS Type A position of the BS 420 is pos 4 (dmrs-AdditionalPosition {pos 0} indicates no additional DMRS symbols), PDSCH/PUSCH start symbol=0, a number of symbols=8, antenna port=#0, and numcdmgroupsw/odata=2, then there may be RE overlap between the BS 410 and the BS 420. For symbol #2, the DMRS of the BS 410 is aligned with the data of the BS 420. For symbol #4, the data of the BS 410 is aligned with the DMRS of the BS 420. This may cause interference. Therefore, the BS 420 may align the DMRS of the BS 420 with the DMRS of the BS 410 by moving the DMRS of the BS 420 to symbol #2 and the data of the BS 420 to symbol #4.

In some aspects, the information may include a physical PDCCH DMRS scrambling identifier ID or other DMRS scrambling parameters for obtaining an uplink DMS scrambling initialization. A DMRS scrambling parameter may include msgA-ScramblingID0-r16 (INTEGER 0 . . . 65535) or msgA-ScramblingID1-r16 (INTEGER 0 . . . 65535). The BS 420 may select a unique value for MsgA scrambling ID in order to mitigate interference in PDCCH DMRS symbols.

The information may include a data scrambling parameter (e.g., msgA-DataScramblingIndex-r16) (INTEGER 0 . . . 1023) that may be used to initiate data scrambling. Other parameters in the information may include an MCS (e.g., msgA-MCS-r16) (INTEGER 0 . . . 15). The BS 420 may select a different or non-overlapping MCS than used by the BS 410. The BS 420 may select a data scrambling ID in order to mitigate interference in PDCCH DMRS symbols.

The BS 420 may use MIB parameters in the information (e.g., PBCH) to obtain SIB1 parameters. The SIB1 parameters may include ServingCellConfigCommonSIB and SCS-SpecificCarrier (subcarrierSpacing and carrierBandwidth). For each neighboring cell such as the BS 410, the BS 420 may find a frequency range (e.g., FR1, FR2) of operation. If the frequency range of the BS 410 is different than the frequency range of the BS 420, the BS 420 may ignore the BS 410 for PUSCH resource selection.

The BS 420 may also determine a duplex mode of operation for the BS 410. For example, if SIB1->ServingCellConfigCommonSIB->TDD-UL-DL-Config IE is present, then the duplex mode is time division duplex (TDD), or unpaired spectrum. If TDD-UL-DL-Config IE (information element) is not present, the duplex mode is frequency division duplex (FDD), or paired spectrum. If the duplex mode of operation is not TDD, the BS 420 may ignore the BS 410 for PUSCH resource selection.

The BS 420 may determine a channel bandwidth used by the BS 410 by applying values for SIB1->SCS-SpecificCarrier->subcarrierSpacing, CarrierBandwidth that may be found in look up tables, such as technical specification (TS) 48.101-1 Table 5.4.2-1 for FR1 and TS 48.101-2 Table 5.4.2-1 for FR2. The BS 420 may select a PUSCH resource using the information extracted from the BS 410 if a frequency range used by the BS 410 is FR2. The BS 420 may also determine the channel bandwidth using an operating frequency (center frequency) and carrier bandwidth of the BS 410. In some aspects, the BS 420 may determine that the channel bandwidth used by the BS 410 either partially or fully overlaps with a channel bandwidth used by the BS 420, and thus the BS 420 may select a PUSCH resource that is in a different channel bandwidth or otherwise based at least in part on the channel bandwidth used by the BS 410. In some aspects, the BS 420 may use the information of the BS 410 to select a PUSCH resource if a frequency range used by the BS 410 and the BS 420 is FR2, if the BS 410 and the BS 420 are configured for TDD, and if a bandwidth used by the BS 410 overlaps with a bandwidth used by the BS 420.

In some aspects, the BS 420 may select a slot for a PUSCH resource that does not overlap with a slot used by one or more neighboring base stations (e.g., the BS 410) for UE transmission of MsgA messages. The BS 420 may modify msgA-PRACH-ConfigurationIndex-r16 because MsgA-PUSCH slots are offset with respect to PRACH slots. In some aspects, the BS 420 may select one or more symbols for the PUSCH resource that do not overlap with one or more symbols used by the BS 410 for UE transmission of MsgA messages. This may also involve choosing a different mappingTypeMsgA-PUSCH-r16 (type A or type B). For example, if the BS 420 selects a different start symbol, then the BS 420 may also have to modify a DMRS mapping type. TS 38.214, Table 6.1.2.1-1 shows valid starting symbol (S) and length (L) combinations for different types (with a normal cyclic prefix). Type A may have S=0 and L={4,14}, and Type B may have S={0,13} and L={1,14}. The BS 420 may select PUSCH symbols that do not overlap if the BS 420 determines that PUSCH slots overlap between the BS 410 and the BS 420.

In some aspects, the BS 420 may select one or more RBs for the PUSCH resource that do not overlap with RBs used by the BS 410 (or other neighboring base stations) for UE transmission of MsgA messages. If RBs of the BS 420 overlap with RBs of the BS 410, the BS 420 may select different DMRS and/or data scrambling IDs to suppress interference with MsgA messages for the BS 410. In some aspects, if RBs overlap, the BS 420 may select a DMRS antenna port configuration for the PUSCH resource that is different than a DMRS antenna port configuration used by the BS 410 for UE transmission of MsgA messages. That is, the BS 420 may select msgA-PUSCH-DMRS-CDM-Group-r16 and msgA-PUSCH-NrofPorts-r16 such that non-overlapping odd and/or even DMRS REs are used with respect to the BS 410. In some aspects, if RBs overlap, the BS 420 may select a DMRS additional position and a maximum length based at least in part on a DMRS additional position and a maximum length used by the BS 410 for UE transmission of MsgA messages.

In some aspects, if RBs overlap, parameters from the information extracted from the BS 410, or MsgA PUSCH configuration values in the information extracted from the BS 410, may include one or more of a time location, a frequency location, an MCS, a DMRS, or a scrambling configuration. The BS 420 may select a PUSCH resource based at least in part on such parameters or values. That is, the BS 420 may select parameters or values that are different from parameters or values used by the BS 410 or other neighboring base stations. In some aspects, transmit power parameters may be based at least in part on an MCS, because transmit power decreases when the MCS decreases. If a reduced MCS makes it difficult to meet MsgA-PUSCH transport block size requirements, the BS 420 may modify a DMRS additional position and a maximum length such that the quantity of DMRS-REs decreases and data REs increase in transport block size. The BS 420 may also modify RB allocations and/or symbols. The BS 420 may set one or more transmit power parameters for the PUSCH resource based at least in part on interference with PUSCH resources allocated by the BS 410 or other neighboring base stations.

As shown by reference number 455, the BS 420 may allocate the PUSCH resource to UE 120 for MsgA transmission. For example, the BS 420 may transmit configuration information for a two-step random access procedure. The configuration information may indicate PUSCH resources that are to be used for MsgA transmissions. In some aspects, the BS 420 may schedule the MsgA transmissions using DCI. As shown by reference number 460, the UE 120 may transmit a MsgA message as part of the two-step random access procedure.

By extracting information (e.g., a MsgA common configuration) from neighboring base stations, a small cell 5G NR base station may select PUSCH resources that avoid interference and collisions of MsgA messages used by the neighboring base stations. The small cell 5G NR base station and the neighboring base stations may conserve processing resources and signaling resources that would otherwise be consumed by failed communications and retransmissions.

As indicated above, FIG. 4 is provided as an example. Other examples may differ from what is described with regard to FIG. 4.

Figure 5:
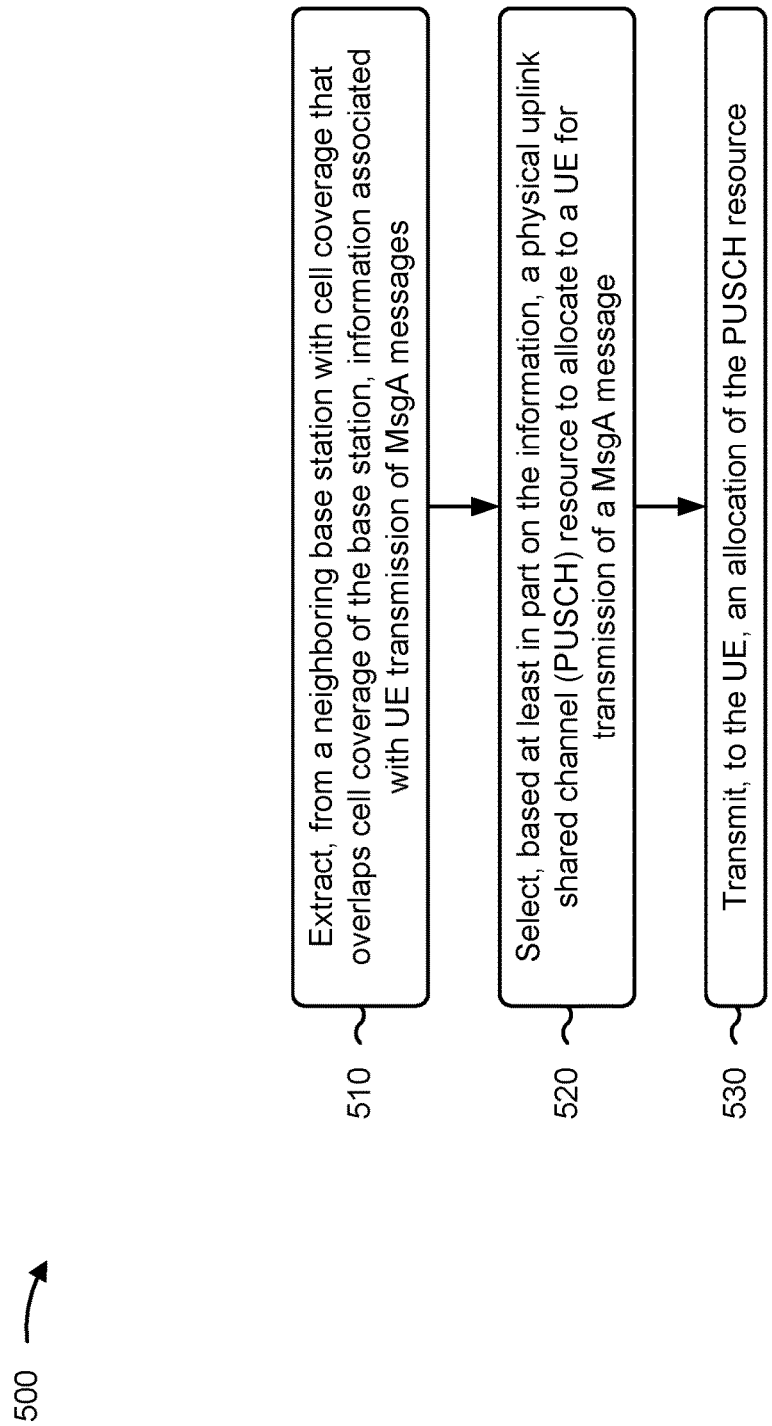
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110, the BS 420) performs operations associated with base station resource selection for a 2-step random access procedure.

As shown in FIG. 5, in some aspects, process 500 may include extracting, from a neighboring base station with cell coverage that overlaps cell coverage of the base station, information associated with UE transmission of MsgA messages (block 510). For example, the base station (e.g., using communication manager 150, reception component 602, and/or extraction component 608 depicted in FIG. 6) may extract, from a neighboring base station with cell coverage that overlaps cell coverage of the base station, information associated with UE transmission of MsgA messages, as described above.

As further shown in FIG. 5, in some aspects, process 500 may include selecting, based at least in part on the information, a PUSCH resource to allocate to a UE for transmission of a MsgA message (block 520). For example, the base station (e.g., using communication manager 150 and/or selection component 610 depicted in FIG. 6) may select, based at least in part on the information, a PUSCH resource to allocate to a UE for transmission of a MsgA message, as described above.

As further shown in FIG. 5, in some aspects, process 500 may include transmitting, to the UE, an allocation of the PUSCH resource (block 530). For example, the base station (e.g., using communication manager 150 and/or transmission component 604 depicted in FIG. 6) may transmit, to the UE, an allocation of the PUSCH resource, as described above.

Process 500 may include additional aspects, such as any single aspect or any combination of aspects described below and/or in connection with one or more other processes described elsewhere herein.

In a first aspect, extracting the information includes extracting the information from an SIB from the neighboring base station.

In a second aspect, alone or in combination with the first aspect, the information includes a BWP uplink common parameter, and process 500 includes using the BWP uplink common parameter to determine PUSCH resources allocated by the neighboring base station for UE transmission of MsgA messages.

In a third aspect, alone or in combination with one or more of the first and second aspects, selecting the PUSCH resource includes selecting a PUSCH resource that avoids overlap with the PUSCH resources allocated by the neighboring base station.

In a fourth aspect, alone or in combination with one or more of the first through third aspects, the information includes one or more frequency domain parameters, and selecting the PUSCH resource includes selecting a PUSCH resource with a frequency domain that is different than a frequency domain indicated by the one or more frequency domain parameters.

In a fifth aspect, alone or in combination with one or more of the first through fourth aspects, the one or more frequency domain parameters include one or more of an interlace for a first PUSCH occasion, an RB for the first PUSCH occasion, a quantity of interlaces per PUSCH occasion, a quantity of PRBs per PUSCH occasion, guard band information for PUSCH occasions, a quantity of PUSCH occasions multiplexed in a time instance, frequency hopping information for a PUSCH occasion, or an RB offset for a second frequency hop.

In a sixth aspect, alone or in combination with one or more of the first through fifth aspects, the information includes one or more time domain parameters, and selecting the PUSCH resource includes selecting a PUSCH resource with a time domain that is different than a time domain indicated by the one or more time domain parameters.

In a seventh aspect, alone or in combination with one or more of the first through sixth aspects, the one or more time domain parameters include one or more of a quantity of slots containing one or more PUSCH occasions with a same time domain allocation, a quantity of contiguous time domain PUSCH occasions in each slot, a combination of start symbol and length and PUSCH mapping type, an index indicating valid combinations of start symbol and length and PUSCH mapping type, a slot offset with respect to a PRACH slot, or a guard period between PUSCH occasions.

In an eighth aspect, alone or in combination with one or more of the first through seventh aspects, the information includes a DMRS configuration, and selecting the PUSCH resource includes selecting a DMRS configuration for the PUSCH resource based at least in part on the DMRS configuration of the neighboring base station.

In a ninth aspect, alone or in combination with one or more of the first through eighth aspects, the DMRS configuration includes one or more parameters that indicate one or more of a PUSCH mapping type, a position for additional DMRS, single-symbol or double-symbol DMRS, a CDM group, a quantity of ports per CDM group, or a quantity of DMRS sequences for a MsgA message.

In a tenth aspect, alone or in combination with one or more of the first through ninth aspects, the information includes DMRS scrambling parameters, and selecting the PUSCH resource includes selecting DMRS scrambling parameters for the PUSCH resource based at least in part on the DMRS scrambling parameters of the neighboring base station.

In an eleventh aspect, alone or in combination with one or more of the first through tenth aspects, the information includes a data scrambling parameter, and selecting the PUSCH resource includes selecting a data scrambling parameter for the PUSCH resource based at least in part on the data scrambling parameter of the neighboring base station.

In a twelfth aspect, alone or in combination with one or more of the first through eleventh aspects, the information includes an MCS, and selecting the PUSCH resource includes selecting an MCS based at least in part on the MCS of the neighboring base station.

In a thirteenth aspect, alone or in combination with one or more of the first through twelfth aspects, selecting the PUSCH resource includes selecting the PUSCH resource based at least in part on one or more MsgA PUSCH configuration values of the neighboring base station.

In a fourteenth aspect, alone or in combination with one or more of the first through thirteenth aspects, the one or more MsgA PUSCH configuration values of the neighboring base station include one or more of a time location, a frequency location, an MCS, a DMRS, or a scrambling configuration.

In a fifteenth aspect, alone or in combination with one or more of the first through fourteenth aspects, selecting the PUSCH resource includes selecting a slot for the PUSCH resource that does not overlap with a slot used by the neighboring base station for UE transmission of MsgA messages.

In a sixteenth aspect, alone or in combination with one or more of the first through fifteenth aspects, selecting the PUSCH resource includes selecting one or more symbols for the PUSCH resource that do not overlap with one or more symbols used by the neighboring base station for UE transmission of MsgA messages.

In a seventeenth aspect, alone or in combination with one or more of the first through sixteenth aspects, selecting the PUSCH resource includes selecting one or more RBs for the PUSCH resource that do not overlap with RBs used by the neighboring base station for UE transmission of MsgA messages.

In an eighteenth aspect, alone or in combination with one or more of the first through seventeenth aspects, selecting the PUSCH resource includes selecting DMRS and data scrambling identities for the PUSCH resource that are different than DMRS and data scrambling identities used by the neighboring base station for UE transmission of MsgA messages.

In a nineteenth aspect, alone or in combination with one or more of the first through eighteenth aspects, selecting the PUSCH resource includes selecting a DMRS antenna port configuration for the PUSCH resource that is different than a DMRS antenna port configuration used by the neighboring base station for UE transmission of MsgA messages.

In a twentieth aspect, alone or in combination with one or more of the first through nineteenth aspects, selecting the PUSCH resource includes selecting a DMRS additional position and a maximum length based at least in part on a DMRS additional position and a maximum length used by the neighboring base station for UE transmission of MsgA messages.

In a twenty-first aspect, alone or in combination with one or more of the first through twentieth aspects, process 500 includes using an operating frequency and a carrier bandwidth of the neighboring base station to determine a bandwidth used by the neighboring base station for MsgA transmissions, where selecting the PUSCH resource includes selecting the PUSCH resource based at least in part on the bandwidth used by the neighboring base station. In some aspects, selecting the PUSCH resource includes selecting the PUSCH resource if a frequency range used by the neighboring base station is FR2, if the information indicates that the neighboring base station is configured for TDD, and if a bandwidth used by the neighboring base station overlaps with a bandwidth used by the base station.

In a twenty-second aspect, alone or in combination with one or more of the first through twenty-first aspects, process 500 includes setting one or more transmit power parameters for the PUSCH resource based at least in part on interference with PUSCH resources allocated by the neighboring base station.

In a twenty-third aspect, alone or in combination with one or more of the first through twenty-second aspects, the one or more transmit power parameters include a MsgA preamble received target power, a MsgA preamble power ramping step, or a MsgA delta preamble.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
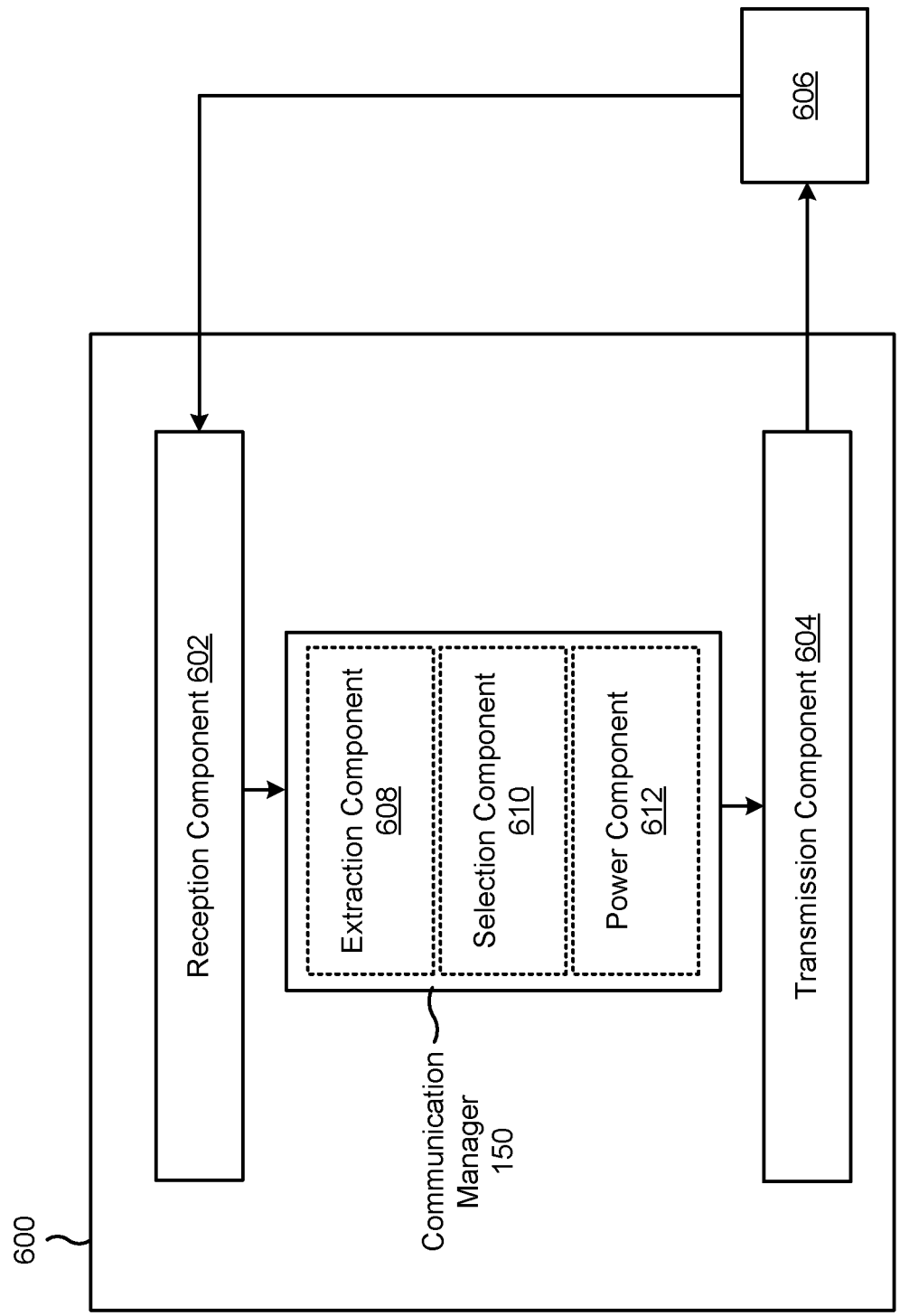
FIG. 6 is a block diagram of an example apparatus for wireless communication, in accordance with the present disclosure.

FIG. 6 is a diagram of an example apparatus 600 for wireless communication. The apparatus 600 may be a base station (e.g., base station 110, the BS 420), or a base station may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 150. The communication manager 150 may include one or more of an extraction component 608, a selection component 610, or a power component 612, among other examples.

In some aspects, the apparatus 600 may be configured to perform one or more operations described herein in connection with FIGS. 1-4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the base station described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a modem, a demodulator, a MIMO detector, a receive processor, a controller/processor, a memory, or a combination thereof, of the base station described in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the base station described in connection with FIG. 2. In some aspects, the transmission component 604 may be co-located with the reception component 602 in a transceiver.

The extraction component 608 may extract, from a neighboring base station with cell coverage that overlaps cell coverage of the base station, information associated with UE transmission of MsgA messages. The selection component 610 may select, based at least in part on the information, a PUSCH resource to allocate to a UE for transmission of a MsgA message. The transmission component 604 may transmit, to the UE, an allocation of the PUSCH resource.

The power component 612 may set one or more transmit power parameters for the PUSCH resource based at least in part on interference with PUSCH resources The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a base station, comprising: extracting, from a neighboring base station with cell coverage that overlaps cell coverage of the base station, information associated with user equipment (UE) transmission of MsgA messages; selecting, based at least in part on the information, a physical uplink shared channel (PUSCH) resource to allocate to a UE for transmission of a MsgA message; and transmitting, to the UE, an allocation of the PUSCH resource.

Aspect 2: The method of Aspect 1, wherein extracting the information includes extracting the information from a system information block from the neighboring base station.

Aspect 3: The method of Aspect 1 or 2, wherein the information includes a bandwidth part (BWP) uplink common parameter, and wherein the method further comprises using the BWP uplink common parameter to determine PUSCH resources allocated by the neighboring base station for UE transmission of MsgA messages.

Aspect 4: The method of Aspect 3, wherein selecting the PUSCH resource includes selecting a PUSCH resource that avoids overlap with the PUSCH resources allocated by the neighboring base station.

Aspect 5: The method of any of Aspects 1-4, wherein the information includes one or more frequency domain parameters, and wherein selecting the PUSCH resource includes selecting a PUSCH resource with a frequency domain that is different than a frequency domain indicated by the one or more frequency domain parameters.

Aspect 6: The method of Aspect 5, wherein the one or more frequency domain parameters include one or more of an interlace for a first PUSCH occasion, a resource block for the first PUSCH occasion, a quantity of interlaces per PUSCH occasion, a quantity of physical resource blocks per PUSCH occasion, guard band information for PUSCH occasions, a quantity of PUSCH occasions multiplexed in a time instance, frequency hopping information for a PUSCH occasion, or a resource block offset for a second frequency hop.

Aspect 7: The method of any of Aspects 1-6, wherein the information includes one or more time domain parameters, and wherein selecting the PUSCH resource includes selecting a PUSCH resource with a time domain that is different than a time domain indicated by the one or more time domain parameters.

Aspect 8: The method of Aspect 7, wherein the one or more time domain parameters include one or more of a quantity of slots containing one or more PUSCH occasions with a same time domain allocation, a quantity of contiguous time domain PUSCH occasions in each slot, a combination of start symbol and length and PUSCH mapping type, an index indicating valid combinations of start symbol and length and PUSCH mapping type, a slot offset with respect to a physical random access channel slot, or a guard period between PUSCH occasions.

Aspect 9: The method of any of Aspects 1-8, wherein the information includes a demodulation reference signal (DMRS) configuration, and wherein selecting the PUSCH resource includes selecting a DMRS configuration for the PUSCH resource based at least in part on the DMRS configuration of the neighboring base station.

Aspect 10: The method of Aspect 9, wherein the DMRS configuration includes one or more parameters that indicate one or more of a PUSCH mapping type, a position for additional DMRS, single-symbol or double-symbol DMRS, a code division multiplexing (CDM) group, a quantity of ports per CDM group, or a quantity of DMRS sequences for a MsgA message.

Aspect 11: The method of any of Aspects 1-10, wherein the information includes demodulation reference signal (DMRS) scrambling parameters, and wherein selecting the PUSCH resource includes selecting DMRS scrambling parameters for the PUSCH resource based at least in part on the DMRS scrambling parameters of the neighboring base station.

Aspect 12: The method of any of Aspects 1-11, wherein the information includes a data scrambling parameter, and wherein selecting the PUSCH resource includes selecting a data scrambling parameter for the PUSCH resource based at least in part on the data scrambling parameter of the neighboring base station.

Aspect 13: The method of any of Aspects 1-12, wherein the information includes a modulation and coding scheme (MCS), and wherein selecting the PUSCH resource includes selecting an MCS based at least in part on the MCS of the neighboring base station.

Aspect 14: The method of any of Aspects 1-13, wherein selecting the PUSCH resource includes selecting the PUSCH resource based at least in part on one or more MsgA PUSCH configuration values of the neighboring base station.

Aspect 15: The method of Aspect 14, wherein the one or more MsgA PUSCH configuration values of the neighboring base station include one or more of a time location, a frequency location, a modulation and coding scheme, a demodulation reference signal, or a scrambling configuration.

Aspect 16: The method of any of Aspects 1-15, wherein selecting the PUSCH resource includes selecting a slot for the PUSCH resource that does not overlap with a slot used by the neighboring base station for UE transmission of MsgA messages.

Aspect 17: The method of any of Aspects 1-16, wherein selecting the PUSCH resource includes selecting one or more symbols for the PUSCH resource that do not overlap with one or more symbols used by the neighboring base station for UE transmission of MsgA messages.

Aspect 18: The method of any of Aspects 1-17, wherein selecting the PUSCH resource includes selecting one or more resource blocks (RBs) for the PUSCH resource that do not overlap with RBs used by the neighboring base station for UE transmission of MsgA messages.

Aspect 19: The method of Aspect 18, wherein selecting the PUSCH resource includes selecting demodulation reference signal (DMRS) and data scrambling identities for the PUSCH resource that are different than DMRS and data scrambling identities used by the neighboring base station for UE transmission of MsgA messages.

Aspect 20: The method of Aspect 18 or 19, wherein selecting the PUSCH resource includes selecting a demodulation reference signal (DMRS) antenna port configuration for the PUSCH resource that is different than a DMRS antenna port configuration used by the neighboring base station for UE transmission of MsgA messages.

Aspect 21: The method of any of Aspects 18-20, wherein selecting the PUSCH resource includes selecting a demodulation reference signal (DMRS) additional position and a maximum length based at least in part on a DMRS additional position and a maximum length used by the neighboring base station for UE transmission of MsgA messages.

Aspect 22: The method of any of Aspects 1-21, further comprising using an operating frequency and a carrier bandwidth of the neighboring base station to determine a bandwidth used by the neighboring base station for MsgA transmissions, wherein selecting the PUSCH resource includes selecting the PUSCH resource based at least in part on the bandwidth used by the neighboring base station.

Aspect 23: The method of any of Aspects 1-22, further comprising setting one or more transmit power parameters for the PUSCH resource based at least in part on interference with PUSCH resources allocated by the neighboring base station.

Aspect 24: The method of Aspect 23, wherein the one or more transmit power parameters include a MsgA preamble received target power, a MsgA preamble power ramping step, or a MsgA delta preamble.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:
   memory; and
   one or more processors coupled to the memory, the memory comprising instructions executable by the one or more processors to cause the network entity to:
   extract, from a neighboring network entity with cell coverage that overlaps cell coverage of the network entity, information associated with user equipment (UE) transmission of MsgA messages, wherein the information includes a bandwidth part (BWP) uplink common parameter;
   determine physical uplink shared channel (PUSCH) resources allocated by the neighboring network entity for UE transmission of MsgA messages based at least in part on the BWP uplink common parameter;
   select, based at least in part on the determining, a PUSCH resource that avoids overlap with the PUSCH resources allocated by the neighboring bases station; and
   transmit, to a UE, an allocation of the PUSCH resource for transmission of a MsgA message.

2. The network entity of claim 1, wherein the instructions, executable to cause the network entity to extract the information, are executable to cause the network entity to extract the information from a system information block from the neighboring network entity.

3. The network entity of claim 1, wherein the information includes one or more frequency domain parameters, and wherein the instructions, executable to cause the network entity to select the PUSCH resource, are executable to cause the network entity to select the PUSCH resource with a frequency domain that is different than a frequency domain indicated by the one or more frequency domain parameters.

4. The network entity of claim 3, wherein the one or more frequency domain parameters include one or more of an interlace for a first PUSCH occasion, a resource block for the first PUSCH occasion, a quantity of interlaces per PUSCH occasion, a quantity of physical resource blocks per PUSCH occasion, guard band information for PUSCH occasions, a quantity of PUSCH occasions multiplexed in a time instance, frequency hopping information for a PUSCH occasion, or a resource block offset for a second frequency hop.

5. The network entity of claim 1, wherein the information includes one or more time domain parameters, and wherein the instructions, executable to cause the network entity to select the PUSCH resource, are executable to cause the network entity to select a PUSCH resource with a time domain that is different than a time domain indicated by the one or more time domain parameters.

6. The network entity of claim 5, wherein the one or more time domain parameters include one or more of a quantity of slots containing one or more PUSCH occasions with a same time domain allocation, a quantity of contiguous time domain PUSCH occasions in each slot, a combination of start symbol and length and PUSCH mapping type, an index indicating valid combinations of start symbol and length and PUSCH mapping type, a slot offset with respect to a physical random access channel slot, or a guard period between PUSCH occasions.

7. The network entity of claim 1, wherein the information includes a demodulation reference signal (DMRS) configuration, and wherein the instructions, executable to cause the network entity to select the PUSCH resource, are executable to cause the network entity to select a DMRS configuration for the PUSCH resource based at least in part on the DMRS configuration of the neighboring network entity.

8. The network entity of claim 7, wherein the DMRS configuration includes one or more parameters that indicate one or more of a PUSCH mapping type, a position for additional DMRS, single-symbol or double-symbol DMRS, a code division multiplexing (CDM) group, a quantity of ports per CDM group, or a quantity of DMRS sequences for a MsgA message.

9. The network entity of claim 1, wherein the information includes demodulation reference signal (DMRS) scrambling parameters, and wherein the instructions, executable to cause the network entity to select the PUSCH resource, are executable to cause the network entity to select DMRS scrambling parameters for the PUSCH resource based at least in part on the DMRS scrambling parameters of the neighboring network entity.

10. The network entity of claim 1, wherein the information includes a data scrambling parameter, and wherein the instructions, executable to cause the network entity to select the PUSCH resource, are executable to cause the network entity to select a data scrambling parameter for the PUSCH resource based at least in part on the data scrambling parameter of the neighboring network entity.

11. The network entity of claim 1, wherein the information includes a modulation and coding scheme (MCS), and wherein the instructions, executable to cause the network entity to select the PUSCH resource, are executable to cause the network entity to select an MCS based at least in part on the MCS of the neighboring network entity.

12. The network entity of claim 1, wherein the instructions, executable to cause the network entity to select the PUSCH resource, are executable to cause the network entity to select the PUSCH resource based at least in part on one or more MsgA PUSCH configuration values of the neighboring network entity.

13. The network entity of claim 12, wherein the one or more MsgA PUSCH configuration values of the neighboring network entity include one or more of a time location, a frequency location, a modulation and coding scheme, a demodulation reference signal, or a scrambling configuration.

14. The network entity of claim 1, wherein the instructions, executable to cause the network entity to select the PUSCH resource, are executable to cause the network entity to select a slot for the PUSCH resource that does not overlap with a slot used by the neighboring network entity for UE transmission of MsgA messages.

15. The network entity of claim 14, wherein the instructions, executable to cause the network entity to select the PUSCH resource, are executable to cause the network entity to select one or more symbols for the PUSCH resource that do not overlap with one or more symbols used by the neighboring network entity for UE transmission of MsgA messages.

16. The network entity of claim 1, wherein the instructions, executable to cause the network entity to select the PUSCH resource, are executable to cause the network entity to select one or more resource blocks (RBs) for the PUSCH resource that do not overlap with RBs used by the neighboring network entity for UE transmission of MsgA messages.

17. The network entity of claim 16, wherein the instructions, executable to cause the network entity to select the PUSCH resource, are executable to cause the network entity to select demodulation reference signal (DMRS) and data scrambling identities for the PUSCH resource that are different than DMRS and data scrambling identities used by the neighboring network entity for UE transmission of MsgA messages.

18. The network entity of claim 16, wherein the instructions, executable to cause the network entity to select the PUSCH resource, are executable to cause the network entity to select a demodulation reference signal (DMRS) antenna port configuration for the PUSCH resource that is different than a DMRS antenna port configuration used by the neighboring network entity for UE transmission of MsgA messages.

19. The network entity of claim 16, wherein the instructions, executable to cause the network entity to select the PUSCH resource, are executable to cause the network entity to select a demodulation reference signal (DMRS) additional position and a maximum length based at least in part on a DMRS additional position and a maximum length used by the neighboring network entity for UE transmission of MsgA messages.

20. The network entity of claim 1, wherein the memory further comprises instructions executable by the one or more processors to cause the network entity to use an operating frequency and a carrier bandwidth of the neighboring network entity to determine a bandwidth used by the neighboring network entity for MsgA transmissions, and wherein the instructions, executable to cause the network entity to select the PUSCH resource, are executable to cause the network entity to select the PUSCH resource based at least in part on the bandwidth used by the neighboring network entity.

21. The network entity of claim 1, wherein the memory further comprises instructions executable by the one or more processors to cause the network entity to set one or more transmit power parameters for the PUSCH resource based at least in part on interference with PUSCH resources allocated by the neighboring network entity.

22. The network entity of claim 21, wherein the one or more transmit power parameters include a MsgA preamble received target power, a MsgA preamble power ramping step, or a MsgA delta preamble.

23. A method of wireless communication performed by a network entity, comprising:
  extracting, from a neighboring network entity with cell coverage that overlaps cell coverage of the network entity, information associated with user equipment (UE) transmission of MsgA messages, wherein the information includes a bandwidth part (BWP) uplink common parameter;
  determining physical uplink shared channel (PUSCH) resources allocated by the neighboring network entity for UE transmission of MsgA messages based at least in part on the BWP uplink common parameter;

selecting, based at least in part on the determining, a PUSCH resource that avoids overlap with the PUSCH resources allocated by the neighboring bases station; and transmitting, to a UE, an allocation of the PUSCH resource for transmission of a MsgA message.

24. The method of claim 23, wherein the information includes one or more frequency domain parameters, and wherein selecting the PUSCH resource includes selecting a PUSCH resource with a frequency domain that is different than a frequency domain indicated by the one or more frequency domain parameters.

25. The method of claim 23, wherein the information includes one or more time domain parameters, and wherein selecting the PUSCH resource includes selecting a PUSCH resource with a time domain that is different than a time domain indicated by the one or more time domain parameters.

26. The method of claim 23, wherein selecting the PUSCH resource includes selecting a slot or symbol for the PUSCH resource that does not overlap with a slot or symbol used by the neighboring network entity for UE transmission of MsgA messages.

27. An apparatus for wireless communication at a network entity, comprising:

means for extracting, from a neighboring network entity with cell coverage that overlaps cell coverage of the network entity, information associated with user equipment (UE) transmission of MsgA messages, wherein the information includes a bandwidth part (BWP) uplink common parameter;

means for determining physical uplink shared channel (PUSCH) resources allocated by the neighboring network entity for UE transmission of MsgA messages based at least in part on the BWP uplink common parameter;

means for selecting, based at least in part on the determining, a PUSCH resource that avoids overlap with the PUSCH resources allocated by the neighboring bases station; and means for transmitting, to a UE, an allocation of the PUSCH resource for transmission of a MsgA message.

28. A non-transitory computer-readable medium storing one or more instructions for wireless communication, the one or more instructions, when executed by one or more processors of a network entity, cause the network entity to:

extract, from a neighboring network entity with cell coverage that overlaps cell coverage of the network entity, information associated with user equipment (UE) transmission of MsgA messages, wherein the information includes a bandwidth part (BWP) uplink common parameter;

determine physical uplink shared channel (PUSCH) resources allocated by the neighboring network entity for UE transmission of MsgA messages based at least in part on the BWP uplink common parameter;

select, based at least in part on the determining, a PUSCH resource that avoids overlap with the PUSCH resources allocated by the neighboring bases station; and transmit, to a UE, an allocation of the PUSCH resource for transmission of a MsgA message.

* * * * *